Patented Sept. 2, 1941

2,254,975

UNITED STATES PATENT OFFICE 2,254,975

MATERIAL FOR PEN TIPS

Milton R. Pickus, Janesville, Wis., assignor to The Parker Pen Company, Janesville, Wis.

No Drawing. Application September 9, 1940, Serial No. 356,045

7 Claims. (Cl. 75—136)

This invention relates to a material for pen tips and more particularly to a composition in which a carbide of a noble metal is employed to give wear resistant properties to the material.

In the manufacture of pens, particularly those intended to be employed for extended periods of time, such as fountain pens, the body of the pen nib should be formed of flexible corrosion resistant material usually a gold alloy. The tip of the pen, however, is subjected to constant abrasion and must be extremely hard and wear resistant. Since inks are, in general, extremely corrosive, the material forming the tip of the pen should also be highly resistant to corrosion. In producing pens a small piece of hard abrasion and corrosion resistant material is usually welded to the point of the nib, the nib is then split and the tip ground to final form.

The grain structure of the material welded to the nib should be very uniform and of fine texture in order to prevent uneven wear and the development of roughened surfaces and should be substantially free from voids or cracks in order to prevent chipping of the material, both during grinding of the tip to final form and during use of the pen. In addition, the material of the tip should readily weld with the material of the body of the nib to produce a mechanically strong corrosion resistant union.

In accordance with the present invention, I have found that platinum carbide can be employed in conjunction with a corrosion resistant metal to produce effective material for pen tips. The platinum carbide may be formed, for example, by adding carbon in proper proportions to molten platinum, or, preferably, by heating a mixture of powdered platinum and carbon in finely divided form to a temperature at least approaching the fusion point of platinum. The molecular ratio of carbon to platinum in the platinum carbide is not definitely known, and it is possible that more than one carbide is formed. Extremely hard corrosion resistant materials are formed with amounts of carbon ranging between 2% and 20% of the platinum.

If the carbide is formed with amounts of carbon in the lower portion of the range given, the resulting fused or sintered mass may be cooled and then broken into small pellets and applied to pen nibs by any desired welding operation, for example, by electrical resistance welding. Such pellets, resulting from breaking sintered or fused masses after these masses have been cooled, are likely to contain cracks or planes of incipient fracture, resulting in a large number of rejects due to disintegration of the material applied to the pen tip during grinding to final form. Such cracks and planes of incipient fracture can be removed by fusing the pellets and reforming them in a suitable manner. Sintering is ordinarily not satisfactory, since the melting point of the platinum carbide is below that of platinum.

It is preferred, however, to employ a relatively large amount of carbon in making the platinum carbide and then crush the resultant mass after it has been cooled into finely divided form in which the particle size is not greater than forty microns and preferably not greater than fifteen microns with a substantial percentage less than five microns. This powdered material may then be mixed with a powdered binder metal having a similar particle size and small portions thereof compressed into small regularly shaped bodies under high pressure. These bodies may then be sintered in a reducing or at least an inert atmosphere at a temperature sufficient to produce a compact uniform structure substantially free from voids.

Although powdered platinum may be employed, a binder metal having a melting point substantially below that of platinum is preferred. The binder metal should, however, have substantial resistance to corrosion. Thus, gold or gold alloys with base metals comprise the preferred binder metal. For high quality pens, the gold should not be below 14 karat gold, that is, the resultant alloy should ordinarily not be less than 58% gold. Metals such as silver or copper are suitable as alloying metals. Alloys of platinum with base metals may likewise be employed but are not as desirable as gold or gold alloys, as they usually have higher melting points. Furthermore, metals or alloys the same or at least similar to the metal or alloy which comprises the nib is preferred since electrolytic corrosion at the interface between the nib and the tip can be largely eliminated in this manner. Thus, since gold alloys are commonly used in nibs on better pens, gold alloys at least similar in composition to the nib are preferred.

The compressed bodies of powdered material may then be sintered at a temperature sufficient to cause the binder metal to at least partially fuse and bind the metal bodies into compact wear resistant and corrosion resistant pellets.

The proportions of hard material to binder metal may vary within wide limits. In general, the proportion of soft binder metal in the final composition should not be substantially less than 10% nor substantially more than 60%. The preferred range of binder metal lies between 15 and 50%, and for high quality pens amounts of binder metal in the lower portion of this range will ordinarily be employed. The proportion of the total which is hard material controls the hardness of the resulting product and for high quality pens the proportion of soft binder metal will ordinarily fall within 15 to 20%. Sufficient binder metal should be present to produce a uniform, securely bonded structure while the presence of too much soft metal reduces the resistance to abrasion.

The pressure employed for compacting the powdered material should be high enough to produce compressed bodies of powdered material which will withstand handling such as that necessary in the removal of the bodies from the molds employed and transferring the same to a sintering furnace. Pressures of the order of 35 to 50 tons per square inch are suitable. Higher pressures merely decrease the shrinkage of the pellets in a subsequent sintering operation but do not materially affect the presence of voids after sintering. Except in the case where platinum is employed as the binder, the temperature of sintering is controlled primarily by the nature of the binder metal as the hard materials contemplated by the present invention have melting points materially above the sintering temperature required for a particular product and no substantial amounts of alloys or eutectics having melting points as low as the sintering temperature appear to be formed. There may, however, be diffusion of the binder metal into the hard particles to produce films of solid solutions between the particles of the hard material so as to securely bond the particles together.

As a specific example of a composition in accordance with the present invention, 90% of powdered platinum and 10% of finely divided carbon may be heated at a temperature of approximately 1750° C. for a period of two hours. The resulting platinum carbide may then be rapidly cooled and crushed to finely divided form. The finely divided material is preferably graded until substantially no particles greater than fifteen microns are present and a substantial portion of the particles are less than five microns. In forming the final product, 85% of the resultant powdered material may be mixed with 15% gold alloy containing 58% gold and the remainder silver. Small portions of this powdered material may then be formed into pellets under a pressure of approximately 35 tons per square inch. The resultant pellets may be sintered at approximately 1200° C. to produce small compact pellets having a substantially uniform structure. Such pellets are extremely hard and wear resistant, having a high resistance to corrosion, and are easily welded to a pen nib.

It is preferred to form particles or pellets which are of the correct size for application to the pen nibs. Such particles or pellets are quite small, a typical size being in the neighborhood of .032 inch in diameter after sintering. Such particles should preferably be of regular form and may be in the form of spheres, spheroids or rectangular pellets. One method of compressing the powdered material is to place the same in small cavities in a rubber member or mold and then subject the rubber member to high pressure in order to uniformly compact the powder. The cavities in the rubber member will be somewhat greater in size than the compressed particle as the powdered material will ordinarily be reduced in volume to ½ or ⅓ its original volume.

It is apparent, however, that the particles of tipping material in accordance with the present invention may be produced in other ways. For example, the powdered mixture may be extruded in thin rods or strips under high pressure and sintered as above described. The rods may be broken or cut into pellets of desired size either before or after sintering or at an intermediate stage of sintering, preferably the latter. Also, relatively large bodies of powdered material may be compressed and sintered and then broken into smaller particles. Alternatively the large bodies may be partially sintered, broken into smaller particles and the sintering completed. Furthermore, the powdered platinum carbide having a particle size within the range above given may be added to a molten body of binder metal and this material formed into small particles in any conventional way, and particularly when relatively large proportions of binder metal are employed particles may be formed by casting, or by shotting the liquid or plastic material as by spraying or dripping the same containing a cool reducing or inert atmosphere. Also, the fused mass may be cooled and welded into small particles. Particles resulting from breaking completely sintered or fused masses of tipping material which have been cooled are extremely likely to contain cracks or planes of incipient fracture resulting in a large number of rejects caused by chipping or shattering of the material when it is ground after having been attached to a pen nib. It is, therefore, preferred to reheat such broken particles to a temperature sufficient to cause at least partial fusion of the binder metal, in which case any cracks or fissures tend to be eliminated and, particularly when large proportions of binder metal are employed, surface tension tends to cause the particles to assume a spherical or spheroidal shape.

When the platinum carbide is first formed and reduced to finely divided form and then admixed with a binder metal having a lower melting point, the final product is essentially a finely powdered hard material with the particles bound together by a continuous phase of softer metal substantially completely surrounding the particles to form a continuous uniform and non-porous structure. Resistance to abrasion depends primarily upon the proportion of platinum carbide to soft binder metal. Since platinum carbide is extremely resistant to corrosion, the corrosion resistant properties of the final product depend primarily upon the nature of the binder metal. Fourteen karat gold is preferred, and will ordinarily be employed, but as above stated, other soft precious metals as well as base metals which have substantial resistance to corrosion may be employed.

Although the material of the present invention finds its chief utility as a material for pen nibs, it will be apparent that the material may be employed wherever resistance to corrosion and abrasion is of importance.

While I have disclosed the preferred embodiments of my invention, it is to be understood that the invention is to be restricted only by the scope of the appended claims.

I claim:

1. As a product of manufacture, a material for pen tips, which comprises, a hard corrosion resistant material consisting predominantly of platinum carbide and containing a relatively soft metal.

2. As a product of manufacture, a material for pen tips, which comprises, platinum carbide in finely divided form bonded together with a relatively soft binder metal having substantial resistance to corrosion said product containing a major portion of said platinum carbide.

3. As a product of manufacture, a material for pen tips, which comprises, platinum carbide in finely divided form bonded together with a relatively soft binder metal having a melting point substantially below that of platinum and having substantial resistance to corrosion said product containing a major portion of said platinum carbide.

4. As a product of manufacture, a material for pen tips, which comprises, platinum carbide in finely divided form bonded together with a binder metal consisting essentially of gold said product containing a major portion of said platinum carbide.

5. As a product of manufacture, a material for pen tips, which comprises, platinum carbide in finely divided form bonded together with a relatively soft noble metal said product containing a major portion of said platinum carbide.

6. As a product of manufacture, a material for pen tips, which comprises, a hard corrosion resistant material consisting essentially of platinum carbide in finely divided form bonded together with a relatively soft metal, said product containing a major portion of said platinum carbide.

7. As a product of manufacture, an abrasion and corrosion resistant material containing platinum carbide and gold, said product containing a major proportion of said platinum carbide.

MILTON R. PICKUS.